Figure 33:
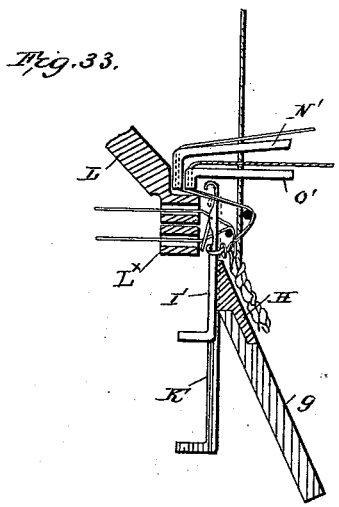

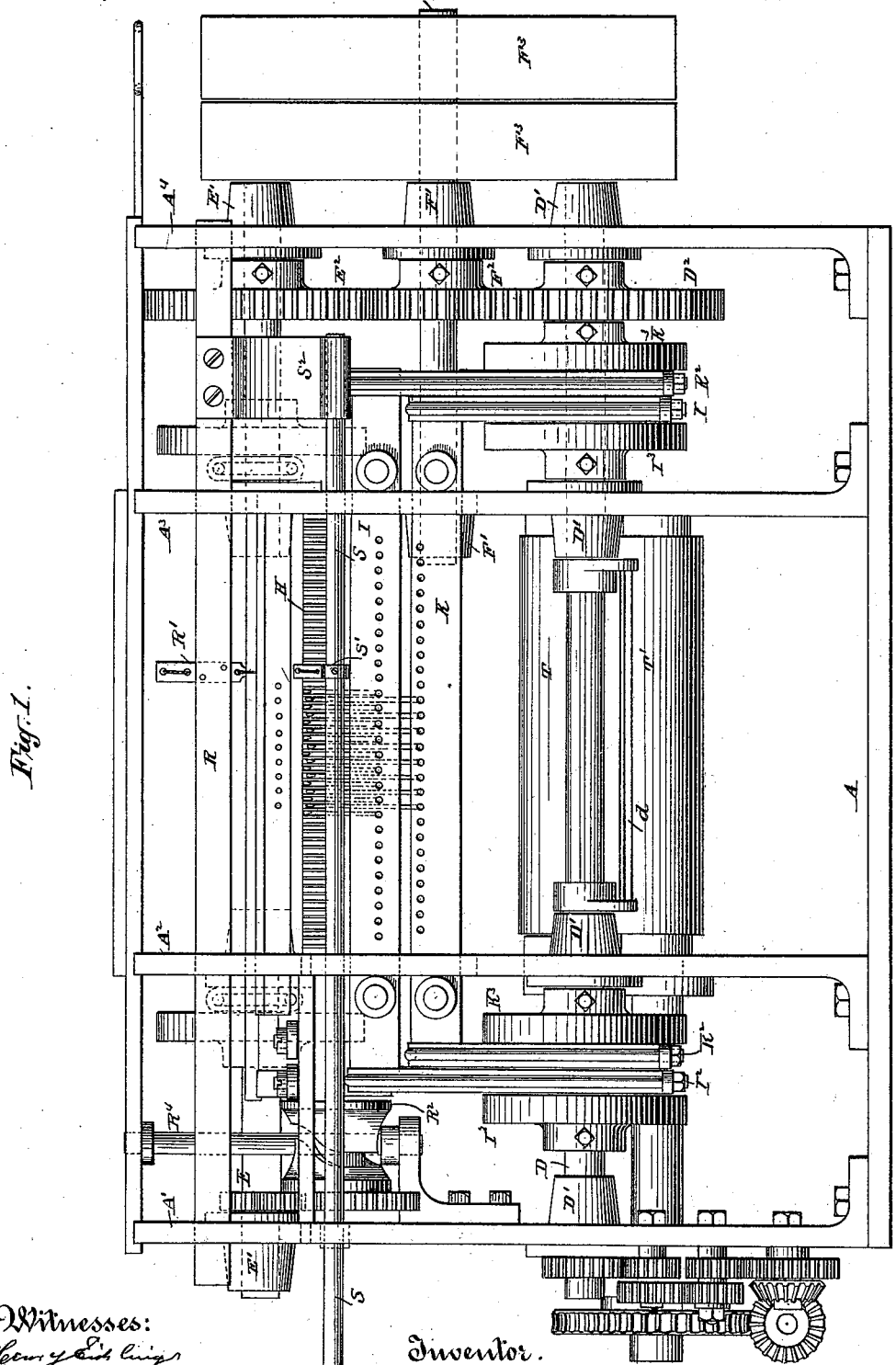

(No Model.)  7 Sheets—Sheet 2.
B. L. STOWE.
KNITTING MACHINE.
No. 393,187. Patented Nov. 20, 1888.
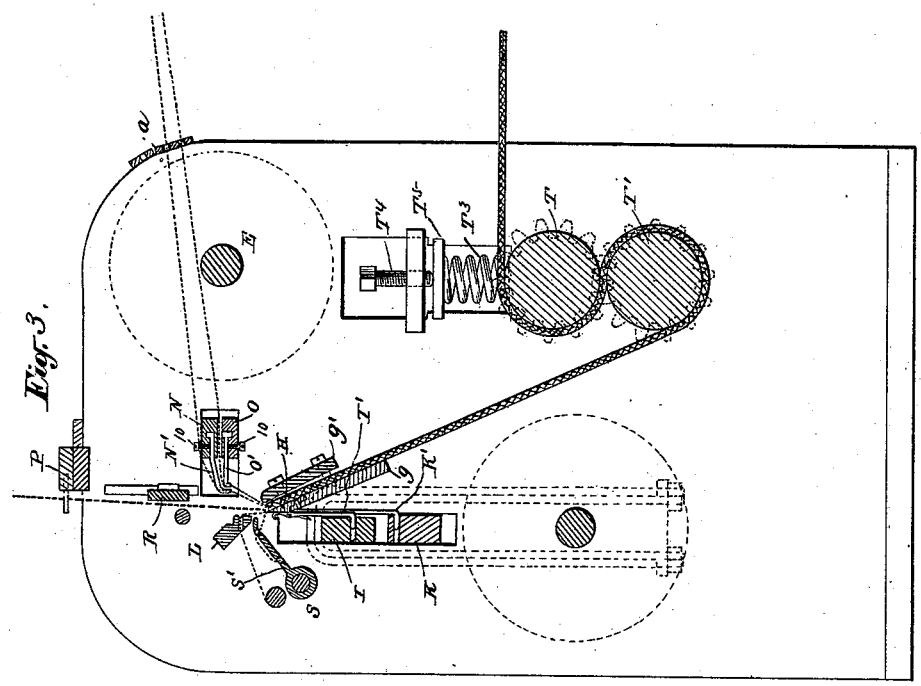
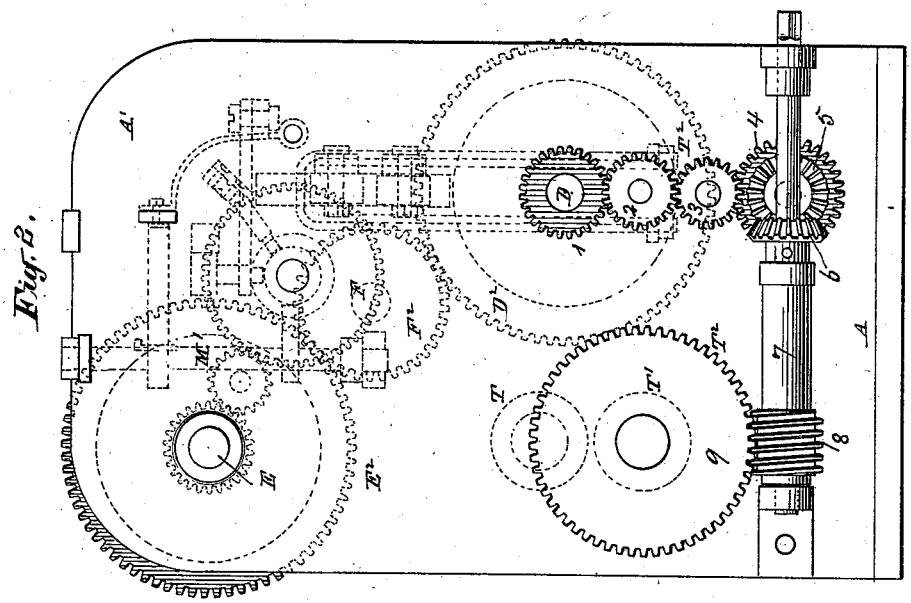
Witnesses:
Henry Eibling
Frederick A. Stowe,
Inventor.
Benjamin L. Stowe,

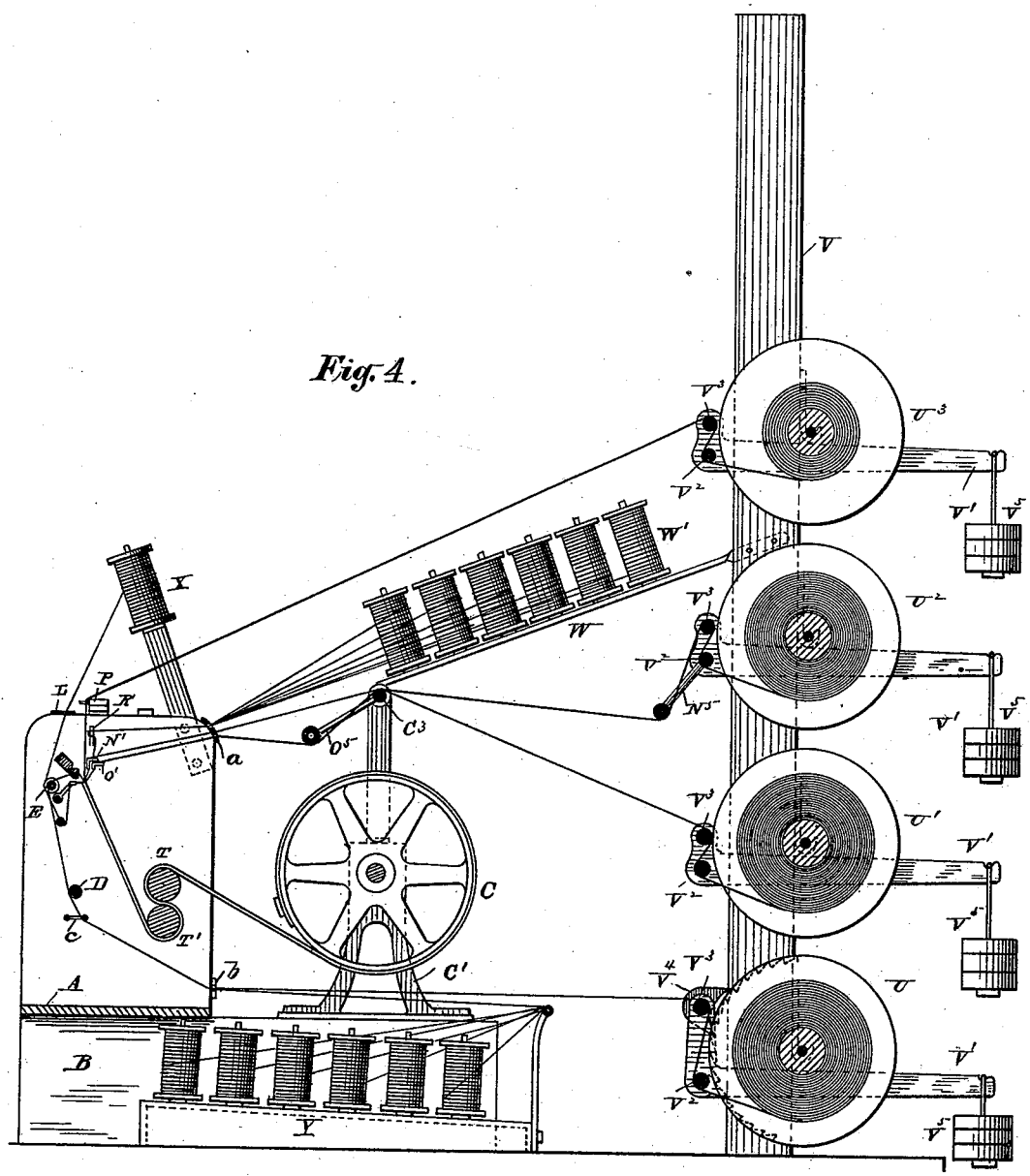

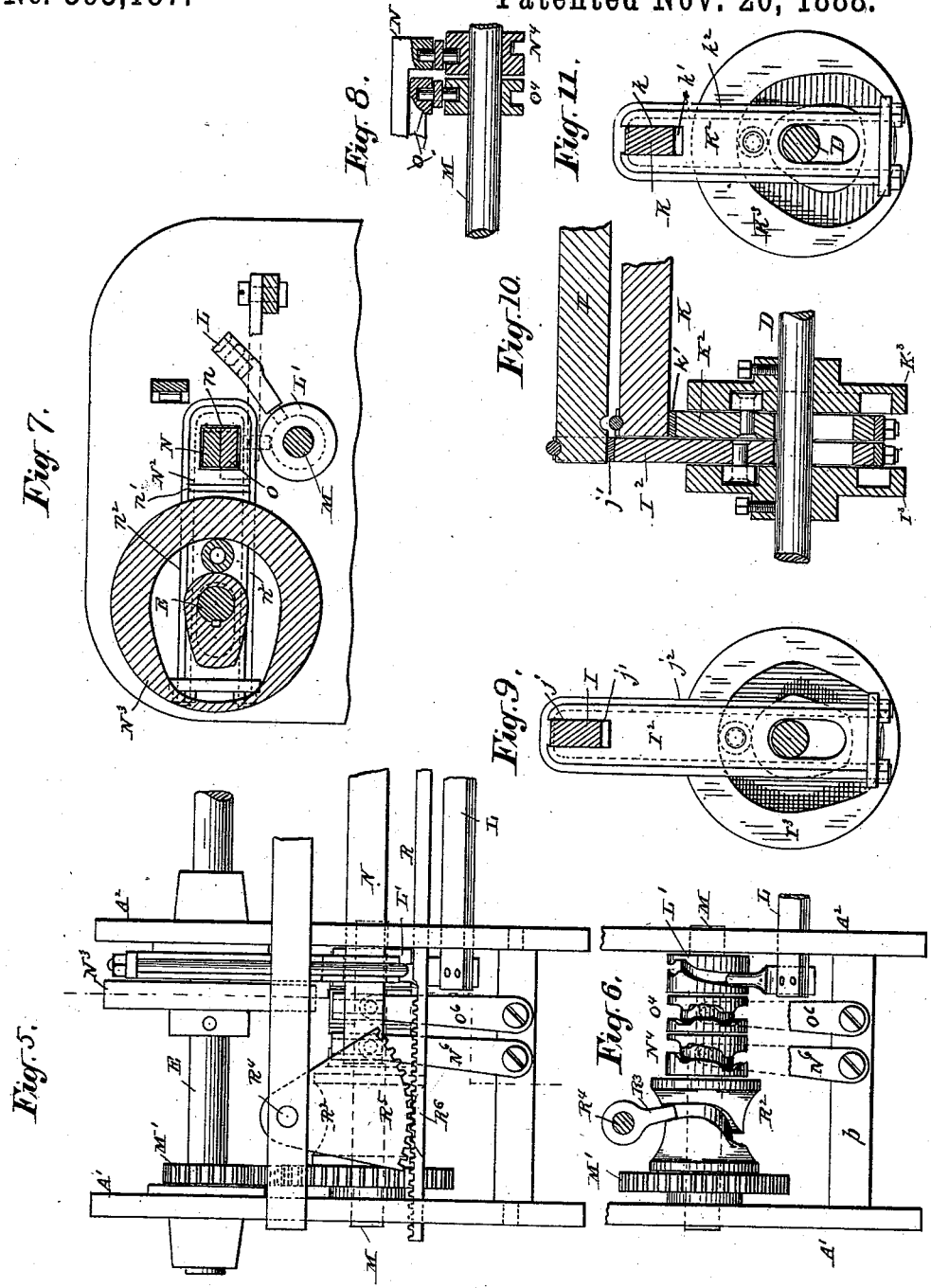

(No Model.) 7 Sheets—Sheet 5.
B. L. STOWE.
KNITTING MACHINE.
No. 393,187. Patented Nov. 20, 1888.
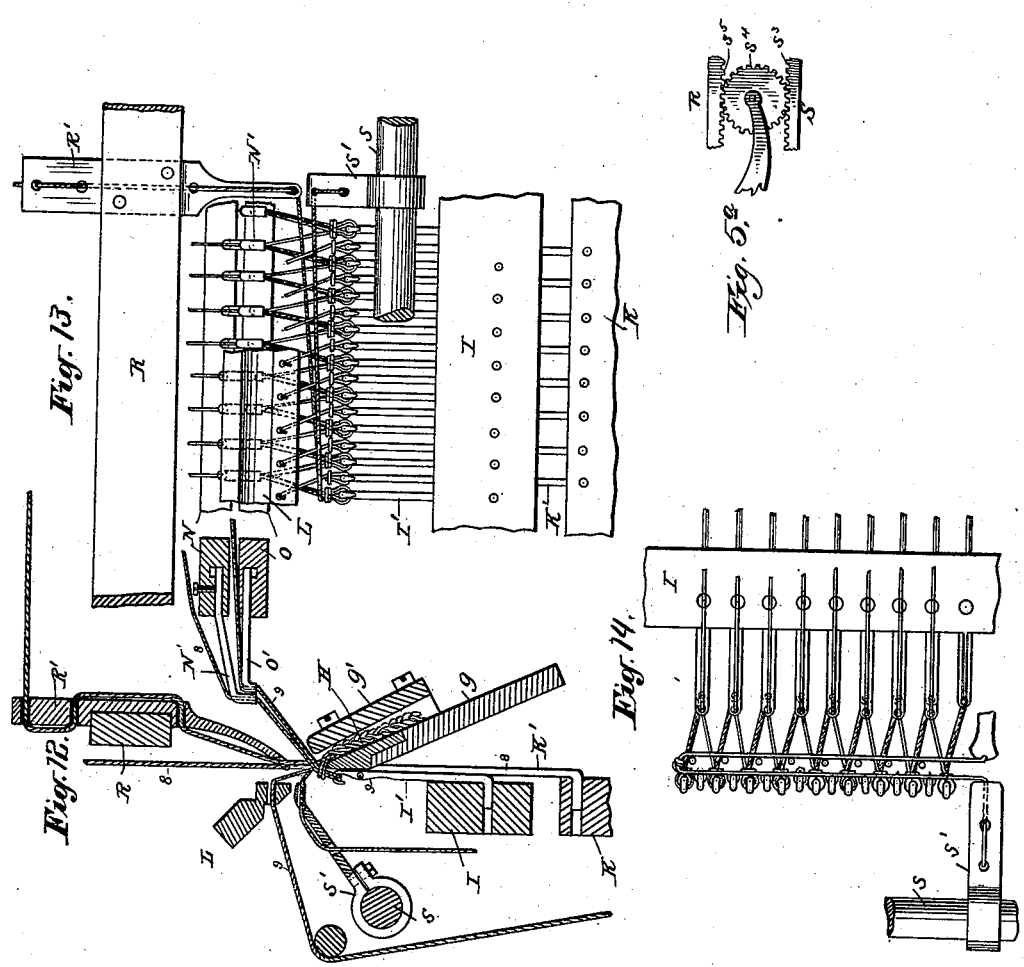

(No Model.) 7 Sheets—Sheet 6.
B. L. STOWE.
KNITTING MACHINE.
No. 393,187. Patented Nov. 20, 1888.
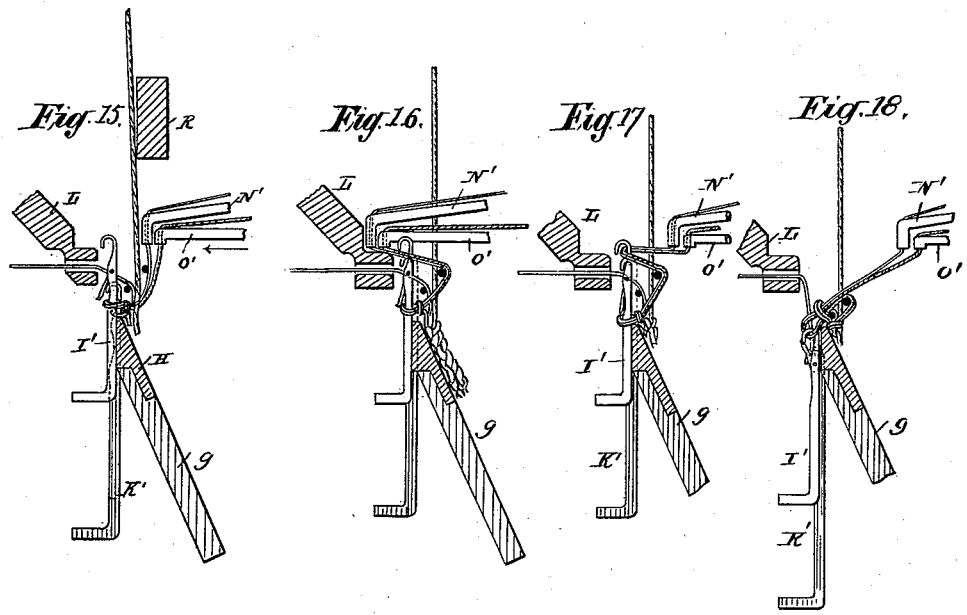
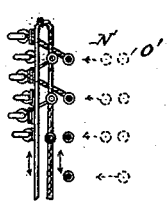
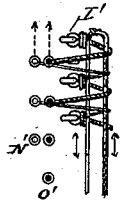
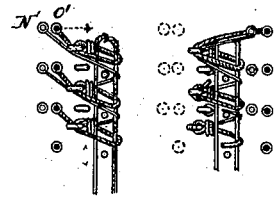
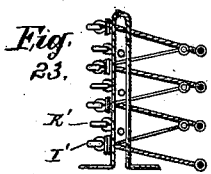
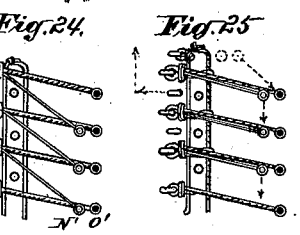
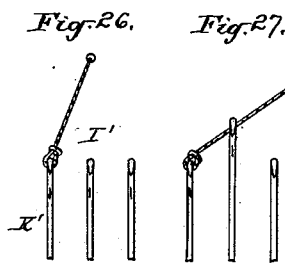
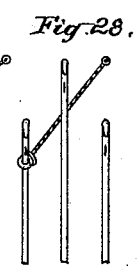
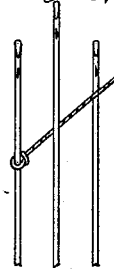
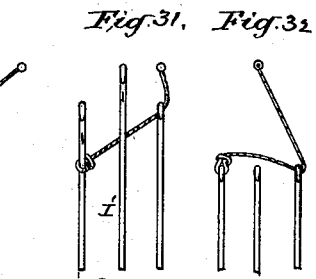
Witnesses:
Henry Eickling
Frederick A. Stowe
Inventor,
Benjamin L. Stowe (No Model.) 7 Sheets—Sheet 7.

B. L. STOWE.
KNITTING MACHINE.

No. 393,187. Patented Nov. 20, 1888.

WITNESSES:
Edwin I. Yowell.
Frederick A. Stowe.

INVENTOR,
Benjamin L. Stowe.

UNITED STATES PATENT OFFICE.

BENJAMIN L. STOWE, OF BROOKLYN, ASSIGNOR OF THREE-FOURTHS TO J. VAN D. REED, OF NEW YORK, N. Y.

KNITTING-MACHINE.

SPECIFICATION forming part of Letters Patent No. 393,187, dated November 20, 1888.

Application filed November 30, 1887. Serial No. 256,560. (No model.)

*To all whom it may concern:*

Be it known that I, BENJAMIN L. STOWE, of Brooklyn, in the county of Kings and State of New York, have invented certain new and useful Improvements in Knitting-Machines, of which the following is a specification.

The machine in which my improvements are embodied is one of the class usually employed for knitting flat fabrics having longitudinal strands and a weft; but many of the features of my invention are adapted for either circular or straight knitting machines. It is more particularly designed to knit a fabric of the kind described in Letters Patent No. 321,153, granted to me June 30, 1885, but with certain modifications may be readily adapted to knit other and similar fabrics.

The special fabric knitted by the entire organization illustrated in the drawings, hereinafter referred to, is one which, while like the fabric described in Patent No. 321,153, just referred to, contains in addition a second weft, which is deposited on the side of the longitudinal strands opposite to that on which the first weft is deposited. This improved fabric has been made by me the subject of separate application for Letters Patent filed December 5, 1887, Serial No. 257,025. I remark here, also, that my improved machine resembles in some respects the machine described and shown in my application for Letters Patent filed February 2, 1882, Serial No. 51,815. They are both straight machines employing two sets of needles; but the present machine, unlike the other one, has both sets working in the same vertical plane, although both machines cause all of the looped stitches to appear on one side of the fabric. In both machines, also, the longitudinal strands and the weft are deposited in the fabric in substantially the same general manner, and the stitches are formed in much the same general way; but in the present machine the operation of the warp-strands is much more eccentric than in the other, some of said strands being fed to the same needles successively, while at the same time the same needles may receive alternately one and the other of two contiguous or adjoining strands of a different series.

I provide about the same number of warps for each series as there are needles of the series to which the warps pertain; but any needle may receive at one time a warp from each of two or more series of warps, and one of these warps may be fed successively to the same needle for each succeeding stitch, while another warp may be fed alternately or variously to this needle and to other needles of the same series. In my present machine no needles pass through the plane of the longitudinal strands, the motion of both series of needles being in a direction parallel with that plane, and consequently the series of needles which correspond to the horizontal needles in my aforesaid application are here supplied with yarns by a series of what I denominate "feeders," and which will be hereinafter fully described. So far as concerns these "feeders," so called, my improved machine contains some features which are shown in a general way in my prior applications for patents filed August 3, 1885, Serial Nos. 173,408 (renewed January 9, 1888, Serial No. 260,220) and 173,407. In the present instance, however, I employ two series of these feeders, all comprising a series being set in a bar, so as to work simultaneously, and said feeders have not only forward-and-back movement, but also lateral reciprocatory movement.

Figure 34:
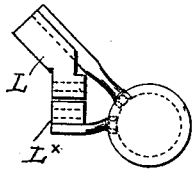
Figure 35:
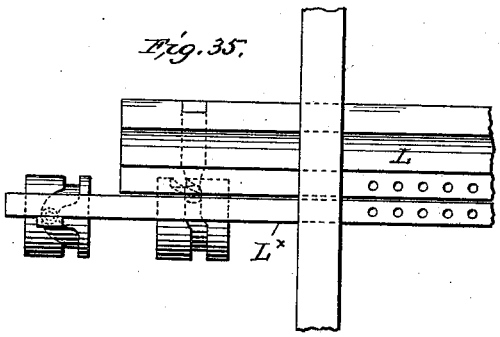

In the drawings accompanying this specification, Figure 1 is a front elevation of my improved knitting-machine. Fig. 2 is a side elevation taken from the left of Fig. 1. Fig. 3 is a central sectional view looking from the right of Fig. 1 into the center of the machine. Fig. 4 is a similar elevation looking from the right of Fig. 1, and includes the take-up and warp, weft, and longitudinal-strand supplying mechanisms. Figs. 5, 6, 7, 8, 9, 10, and 11 illustrate various cam mechanisms by which motion is given to the knitting mechanisms. Fig. 5ª represents a modified form of connection between the two weft-depositing rods R S, which will be more particularly referred to hereinafter. Figs. 12, 13, and 14 illustrate the manner in which the constituent threads are led into the fabric. Figs. 15 to 32, inclusive, illustrate the manner in which the stitches are formed, Figs. 15, 16, 17, and 18 showing various portions of the needles and feeders in side elevation, while Figs. 19, 20, 21, 22, 23, 24, and 25 illustrate the same in plan. Figs. 26 to 32 are front elevations of needles. Figs. 33 to 35, inclusive, are views of modifications, hereinafter referred to.

The main frame of this machine consists of a bed-plate, A, from which arise four uprights, $A' A^2 A^3 A^4$, of sufficient depth from front to rear to afford support to all of the knitting mechanisms. The bed-plate A is bolted to timbers B, Fig. 4—one at each end—which timbers extend out beyond the back side of the machine and afford supports for the hangers C', supporting the take-up reel C. Two driving-shafts, D E, run the entire length of the bed through bearings D' E', set in each of the four uprights. These two shafts D E are connected by gearing $D^2 E^2 F^2$ with a main driving-shaft, F, which runs through bearings F', located one each in the right-hand two uprights, $A^3 A^4$. This main driving-shaft F extends out beyond the extreme right-hand end of the machine and carries the two main pulleys $F^3$.

The knitting mechanism consists of a needle-bed, $g$, Fig. 3, supported by the middle two uprights, $A^2 A^3$, and which bed supports the kerfed needle-guide bar H. There is another bar, $g'$, supplementary to the needle-bed, which serves to strengthen the said bed $g$, but whose principal office is to hold the fabric while it is being knitted close over against the needles. The knitting mechanism further comprises two needle-bars, I K—one for each series of needles I' K'—each needle having a foot turned out at right angles to its body and entering a perforation in one of the needle-bars. The needles, I', entering the upper bar, I, are shorter than those, K', pertaining to the lower bar, K, and in operation their hooks rise to a higher point than the others; but all of both series descend to about the same point— viz., one at which their stitches will be readily slipped over their points. The needle-bars I K receive their motion (see Figs. 9, 10, and 11) through the medium of connecting-rods $I^2 K^2$ from the cams $I^3 K^3$, fastened upon and revolving with the lower of the two driving-shafts D, a pin from each connecting-rod entering the lateral cam-groove in its appropriate cam-disk, $I^3$ or $K^3$.

The knitting mechanism further consists of a yarn-guide bar, L, whose office is to supply the requisite warp-threads—one for each needle— to the series of needles pertaining to the lower needle-bar, K. This yarn-guide bar L receives certain longitudinal motions from the cam L'. (See Fig. 6.) This cam L' is located upon a cam-shaft, M, which has a bearing in the left-hand two uprights, $A' A^2$, and receives motion, through the medium of the gearing M', from the upper driving-shaft, E. This shaft E also carries other cams, to be hereinafter mentioned.

N O are two feeder-bars, each with its series of feeders N' O', whose office is to supply to the needles, I', pertaining to the upper needle-bar, I, their requisite warp-threads. There is usually one feeder of each series for each of the needles. The feeder-bars receive a forward-and-back motion, through the medium of the connecting-rods $N^2$, from cams $N^3$, fastened to and revolving with the upper driving-shaft, E. (See Fig. 7.) Each of these feeder-bars N O also receives a certain longitudinal reciprocatory motion from cams $N^4$ $O^4$, located upon the cam-shaft M, already mentioned, Fig. 8, there being a separate cam for each feeder-bar. A guide-bar, P, Figs. 3 and 4, for the longitudinal strands extends across the top of the machine and has pins driven into its front face in such positions as to guide the said strands into their proper positions in the fabric.

The weft-depositing devices consist of two rods, R S—one placed above the needle-bed G and behind the longitudinal strands, the other placed in front of the needle-bed G and the longitudinal strands. Each of these rods carries a series of fingers, R' S', which lead their respective wefts close to the point at which it is required that they shall be deposited into the fabric. These fingers may be of the form shown, or they may be of other suitable form. The weft-carrier rods receive a longitudinal motion from a cam, $R^2$, Fig. 6, of peculiar form, located upon the before-mentioned cam-shaft M, the motion being transmitted from the cam to the upper rod by means of the finger $R^3$, rocker-shaft $R^4$, segment of a gear, $R^5$, Fig. 5, and rack $R^6$ upon the said upper rod, and from the upper rod to the lower by means of connection $S^2$ between the two. (See right of Fig. 1.) I sometimes prefer, however, to give the two rods motion in reverse directions, in which case I connect them either by means of a fulcrumed lever or by gearing, so that while one is moving to the right the other will travel to the left, and vice versa, as indicated in Fig. $5^a$, where the right-hand end of the rod S is shown provided with a rack, $S^3$, which gears with an intermediate pinion, $S^4$, supported in a suitable bracket attached to the frame of the machine, which pinion in turn gears with a rack, $S^5$, on the rod R.

The knitting mechanism still further comprises take-up mechanism consisting of two parallel rolls, T T', Fig. 3, having bearings in the middle two uprights, $A^2 A^3$, the lower roll extending out beyond the left-hand upright, and suitable gearing, $T^2$, for communicating the requisite motion from the lower driving-shaft to the said take-up rolls, said gearing $T^2$ consisting, as shown clearly in Fig. 2, in this instance, of the gear 1 on shaft D, which, through the intermediate toothed wheels, 2 3 4, and the beveled gear 5 on the hub of the last-named wheel, drives a beveled gear, 6, fast on cross-shaft 7, the latter being provided with a worm, 8, which gears with a worm-wheel, 9, on the shaft of roll T'. Roll T' is provided with a pinion, which gears with and drives a like pinion fast on roll T, as shown by dotted lines in Fig. 3. The said take-up mechanism also comprises a take-up reel, C, located back of the machine. This take-up reel is similar in principle to one described in my application for Letters Patent upon circular looms, filed of even date herewith, and will therefore require no further description here.

The knitting mechanism further consists of the following-described yarn-supplying and tension-regulating devices, (see Fig. 4:)

The bulk of the material used is carried upon beams of a usual construction. The balance is carried upon bobbins, also of a usual construction. The beams are supported by bearings fastened to the upright posts V, and the bobbins are supported by creels W X Y, fastened, one, W, to the posts V, one, X, to the top of the machine, and one, Y, upon the floor beneath the take-up reel C. Friction is applied to the beams U U' U² U³ by means of the weighted levers V' (having bearings upon the shafts V², which in their turn have bearings fastened to the posts V) through the medium of the bars V³, which are pressed by the shorter arms of the levers against the periphery of the beams. Suitable frictional bearings, V⁴, are placed between the rods and the beams, and I sometimes prefer to notch the edges of the beams in order to better regulate the tension of yarns. In the drawings said frictional device V⁴ is shown applied to one of the beams only, its representation in connection with the others being omitted in order not to obscure the parts.

In the drawings, Fig. 4, the upper or fourth beam, U³, supplies the longitudinal strands. These strands lead from the beam under and beyond the stationary cross-rod V², then up and back of the upper friction-rod, V³, and from thence out to the longitudinal strand-guide bar P and between the pins upon the face of the said bar, and from thence downward into their positions in the fabric. The frictional tension is automatic in its operation, the amount of tension upon the yarn being governed entirely by the amount of weight applied to the lever, especially when the periphery of the beam is notched. In this case it is impossible for the beam to revolve until the tension of the yarn is sufficient to raise the weight V⁵, and thereby cause the beam to be relieved by the drawing away of the friction-rod V³. Immediately the beam revolves the tension of the yarn is reduced, and the friction-rod V³ again comes against the face of the beam and interrupts its revolution. The third beam, V², supplies the yarns which are fed by the upper series of feeders, N', to the upper set of needles, I', and which constitute in the drawings of the patented fabric hereinbefore mentioned, Fig. 5, Patent No. 321,153, the binder-warps. These warps lead from the beam U² around the automatic tension-bars V² V³, from thence down under a swinging bar, N⁵, over a stationary bar, C³, through a perforated guide-bar, a, fastened to the uprights of the machine, and finally through the upper set of feeders, N'. The swinging bar N⁵ consists of a straight bar hung by links from the stationary bar V² in such manner that the weight of the bar is at all times upon the cords, and its purpose is to keep the strands taut notwithstanding the forward and backward movement of the feeders, which would otherwise slacken them at times. The yarns from the second beam, U, lead about the automatic tension V² V³, over bar C³, and under swinging bar O⁵, through perforated bar a, and thence to the lower series of feeders, O', by which feeders O' they are fed to the upper series of needles, I', simultaneously with the yarns from the third beam, U², that are manipulated by the upper feeders, N'. A yarn from the second beam, U', is usually supplied successively to the same needle, while those from the third beam, U², are generally supplied alternately to one and another of two needles. The yarns from the first or lower beam, U, are passed around the automatic tension, thence forward and through a perforated bar, b, fastened to the back of the machine, and then through another perforated bar, c, just below the lower driving-shaft, D, up over a guide-rod, E, and thence through the yarn-guide bar L, by which they are supplied to the lower series of needles.

A striking-rod, d, is sometimes fastened to the lower shaft, (see Fig. 1,) whose office is to strike the last-described warps at a required time, and thereby cause the tension to be increased and lessened at required times.

The yarns leading from the bobbins upon the creel Y beneath the take-up reel belong to the same series as those leading from the lower beam, U; but the bobbin-cords are the ones which enter into the edge of the fabric, and in consequence of the peculiar formation of the selvage do not "take up," or, in other words, are not consumed, as fast as the remaining strands of the series.

The cords leading from the creel W above the take-up reel are led through proper guides and tensioning devices to weft-depositing fingers R' upon the rearmost weft-carrier rod, R. The cords leading from the creel X immediately above the center of the machine lead down and around guide-bars, and thence to the weft-depositing fingers S' upon the lower weft-carrier rod, S. In making fabrics upon this machine I prefer that the knitting-warp should be some multiple of the number of needles employed; but the precise number may be varied to suit the requirements of a particular fabric, and especially for the formation of desired edges.

Having enumerated the principal parts of the machine, I will now proceed to describe more particularly the construction of such of the parts as seem to call for additional explanation.

The construction of the needle-bed G will be obvious to any one skilled in the art by an observation of Fig. 12, except that, as illustrated, the lower needle-bed is somewhat back of the other. I sometimes place them in that manner. The supplementary bar $g'$ is bolted to the needle-bed near its outer ends, and unless a single broad fabric is made they are also bolted together at the center, spacing-pieces being used to preserve a sufficient space for the fabric to pass readily between the two bars. The upper side of the supplementary bar is sufficiently raised above the needle-bed to hold the fabric well over toward the needles against the tendency of the tension upon the fabric and longitudinal strands to draw it away. The needle-bars and cams that operate them will need no further description.

The connecting-rods $I^2$ $K^2$ consist of bars slotted to permit of their being placed upon the shafts and to allow them free motion in that position. The connecting rods are also provided with an open slot, $j\ k$, at one end, which slot is fitted sidewise to the needle-bars I K. The needle-bar is adjustable in its relation to the connecting-rod by means of removable packing $j'\ k'$, placed in the bottom of the slot beneath the needle-bar, and the bar is held tightly against this packing by means of the clip-bolt $j^2\ k^2$, which embraces the rod and bar. The feeder-bars N O are composed of two flat bars arranged to slide back and forth in slots in the middle two uprights, $A^2\ A^3$. The feeders $N'\ O'$ consist of a piece of wire, a small portion of which is bent to nearly a right angle with the main portion, and this L-shaped end is drilled longitudinally, so as to form a tube. These feeders are set into the front edges of the feeder-bars by drilling a hole for each, slipping the feeder into the said hole, and securing it by means of a set-screw, 10. The lower ends of all the feeders require to be upon the same level, and consequently the upper feeders, $N'$, receive an additional bend to bring them down to the level of the lower feeders, $O'$. The cam $N^3$, which gives to the feeder-bars their forward and backward movement, will require no explanation, as its form is obvious from Fig. 7.

The connecting-rods $N^2$, which operate the feeder-bars, differ from those that operate the needle-bars only in the method of connecting the rods and bars. It is necessary that the feeder-bars should be free to move longitudinally through their connecting-rods, and consequently the clip-bolts do not grip the feeder-bars, but the bars pass easily through a quadrangular slot, $n$, in the rods. The rod itself is cut in two pieces, and the necessary adjusting packing $n'$ is placed between the two pieces, and the whole is gripped firmly together by the clip-bolt $n^2$. To ascertain the form of cams necessary to give the longitudinal motion to the feeder-bars and to the yarn guide bar which the operation hereinbefore described requires is, when the precise motion required is known, only a matter of mechanical computation. They are, however, illustrated in Fig. 6. Owing to the fact that the feeder-bars have a transverse as well as a longitudinal motion, a provision must be made for transmitting motion from the cams to the bars notwithstanding the said transverse movement. To do this I provide a transverse slot across the bottom side of each of the feeder-bars. (See Fig. 8.) Levers $N^6$ $O^6$ are provided, each one of which is pivoted at one end to a bar, $p$, reaching from one to the other of two uprights, $A'\ A^2$, and each lever extends back and has a pin passing through it directly over the axis of the cam. This pin carries upon its end which projects from the under side of the lever a cam-roll, which enters one of the cams, $N^4$ or $O^4$, so that the motion that the cam is intended to impart is given to the end of the lever $N^6$ or $O^6$. The end of the pin reaching above the upper surface of the lever carries a similar roll, and this roll enters into the transverse slot in the lower face of the feeder-bar N or O, so that the motion transmitted from the cam to the lever is further transmitted to the feeder-bar, giving required longitudinal motion to that bar without interference with the transverse motion which it receives from the cams. There is a lever for each of the feeder-bars. The cam $R^2$, intended to operate the weft-carrier bars R S, is of peculiar construction. (See Figs. 5 and 6.) The said cam possesses a concave periphery, the center of whose arc forms the axis of a rocker-shaft, $R^4$. The sides of the cam-groove are cut so that they are parallel at all times with a radius-line drawn from the center of the rocker-shaft $R^4$ to the middle of the cam-groove in such a manner that a cam-roller carried by a finger, $R^3$, projecting from the rocker-shaft $R^4$, has a fair bearing at all times upon the side of the cam-groove. This device enables me to convert the rotary motion of the cam-shaft M into an oscillating and intermittent motion of the rocker-shaft $R^4$, and that motion is converted by the segment of a gear, $R^5$, and rack $R^6$ into the requisite back-and-forth longitudinal movement of the weft-carrier rods R S. The arrangement of change-gearing $T^2$ employed to drive the take-up rolls T T' will be shown by the drawings to any skilled machinist. The lower of the two take-up rolls, T', is journaled in bearings fixed in the three uprights $A'\ A^2\ A^3$, beginning at the left side of the machine.

The upper roll is journaled in boxes that are free to slide up and down in slots in the uprights to which the said boxes pertain, (the middle two,) subject only to the stress of the compress-spring $T^3$, which is so arranged as to be more or less compressed, as desired, by means of a set-screw, $T^4$, acting upon a cap, $T^5$, resting upon the top of the spring $T^3$.

I now proceed to describe, generally, the times in which the parts operate. The two driving-shafts D E revolve at one-half the speed of the main driving-shaft F, and as the needle-bars I K and feeder-bars N O are operated by the cams $I^3$ $K^3$ $N^3$, located upon these shafts, each of those bars makes one complete operation to each revolution of the said driving-shafts D E, except that the longitudinal motion of the feeder-bars N O is governed by cams $N^4$ $O^4$, located upon the cam shaft M, and this shaft revolves at only one-half the speed of the driving-shafts D E. As a consequence of this and of the form of the cam $N^4$, (which is shaped to impart one complete reciprocation or longitudinal movement in each direction to the bar N during each revolution of shaft M,) the upper feeder-bar, N, makes a longitudinal movement in one direction during one revolution of the driving-shafts D E and in a reverse direction during the next revolution of the driving-shafts D E. The lower feeder-bar, O, is operated by a cam, $O^4$, one half of which is a duplicate of the other half, so that the said bar O makes a complete movement at each half-revolution of the cam-shaft M and for each full revolution of the driving-shafts D E. It should here be noted that the upper feeder-bar, N, always operates simultaneously with the lower feeder-bar, O, in both its lateral and longitudinal movement. As concerns the longitudinal movement, however, the bar O will, as hereinbefore indicated, make two complete reciprocations for each complete reciprocation of the bar N. The yarn-guide bar L, which supplies the lower set of needles, K', is operated by a cam, L', which gives it an irregular longitudinal movement to the right during one half-revolution of the cam-shaft M or full revolution of the driving-shafts D E and a similar movement toward the left during the remaining half-revolution of the cam-shaft M. The weft-carrier rods R S have a right and left longitudinal movement, which consists of a movement in one direction during one half-revolution of the cam-shaft M and in a reverse direction during the remaining half-revolution. The take-up rolls T T' are revolved at a speed suitable to carry away the fabric from the needles as fast as it is produced, and that speed is governed by the system of change-gearing $T^2$. The take-up reel C winds up the fabric as fast as the rolls T T' yield it to them. The beams and bobbins yield up the material wound upon them only as the machine draws it away from them.

The precise times in which the parts operate are indicated more particularly in the description of the knitting operation, which I shall now proceed to give. Suppose that a stitch has just been completed and the needles I' K' are in their lowest position, the feeder-bars N O are in their back position, the lower feeder-bar, O, is in a position longitudinally which it always occupies when in its back position—viz., one in which the feeders O' that it carries are directly opposite the spaces between the upper needles—the upper feeder-bar, N, is in its left-hand position—viz., one in which its feeders have just completed a movement to the left hand as one faces the machine equal in amount to the distance from one feeder to the other—and has stopped with its feeders directly over those of the lower bar, the yarn-guide bar L is in its extreme left-hand position, the weft-carrier rods are in their extreme right positions, and each finger is just to the right of the piece of fabric to which it pertains. It should be noted that the machine is intended to knit either one broad or a number of narrow ones, and the number of fingers upon each rod equals the number of pieces of fabric to be produced, except in cases where the fingers described in my aforesaid application, Serial No. 51,815, are employed, when any convenient number of fingers may be used, such slight modifications of the shape of the cam which operates the weft-carrier rod being made as will permit these fingers to follow the longitudinal motion of the feeder-bars while the said fingers are between the feeders. For the purpose of illustration we will divide the forward movement from the present point into a series of imaginary steps, taking the position already indicated as a starting-point. The tops of all the needles are just below the top of the kerfed sections of the needle-bed, as indicated in Fig. 12, the position of the various strands and of the feeders being indicated in plan in Fig. 23. We will now advance one step to the position indicated in Figs. 15 and 19, but will note the action of some of the parts *en route*.

The grooves in the cams $I^3$ $K^3$ and the length of the connecting-rods $I^2$ $K^2$ are so adjusted that, while the needles descend to about the same point and consume about the same amount of time in rising to their highest positions, the upper needles, I', rise faster and higher than the lower ones. The perforations in the yarn-guide bar L are equal in number to the lower needles, K', and are spaced the same distance from center to center, which distance, for convenience of illustration, we will call one-fourth of an inch. The entire longitudinal movement of the yarn-guide bar is double the amount of that distance, or, say, one-half of an inch in either direction, and when the bar is in an extreme position a perforation is directly in front of an upper needle, I'. The warps supplied by this bar L are knitted alternately by one or the other of two contiguous needles, K', and we will suppose that a particular one will form its next stitch upon the right-hand needle of the pair, and consequently the warp will lead from the hook of the left-hand needle upon which it was last knit diagonally past the back of an upper needle to a perforation beyond the right-hand needle. (See Fig. 27.) As the upper needle rises, the yarn-guide bar L will now move one-eighth of an inch toward the left, and the upper needle will pass midway between two perforations, Fig. 28. Immediately after the said upper needle has passed the plane of those perforations the yarn-guide bar will move one-eighth of an inch farther toward the left, in order that when the hook of a lower needle, K', reaches the plane of perforation that also may pass midway between two perforations, Fig. 29. The object of this movement is to prevent the hooks of the needles from catching into the perforations. During the movements described the feeders have advanced in a direct line to the positions shown in the figures referred to—viz., 15 and 19. The dotted circles in Fig. 19 indicate the previous positions of the feeders. The next step will have carried us to the position indicated in Figs. 16 and 20; but it will again be necessary to describe the action of the several parts during their progress from the preceding step to the present one. The yarn-guide bar will have made no movement. The needles will have reached their highest position, which will have brought the tops of the upper needles, I', just below the level of the body of the feeders O', but above the lowest extremity of the feeder, and will have brought the hooks of the lower needles, K', above the plane of the perforations in the yarn-guide bar L, but not high enough to prevent the passage of the feeders N' O' over their tops. The feeders N' O' will have been pushed forward between the longitudinal strands and between the upper needles, I', passing over the tops of the lower needles, K'. The position indicated in Figs. 16 and 20 will now be reached, and we may now proceed to the position indicated in Fig. 21. To reach that position the yarn-guide bar L will have moved one-quarter of an inch to the right, which movement will have carried the warp (shown in Fig. 26 as running to the hook of the left-hand needle of the pair chosen for purpose of illustration) under the hook of the right-hand needle, Fig. 30. The feeder-bars will have made no forward or backward movement, but will have been moved longitudinally by the cams one-quarter of an inch toward the left, so that the yarns running from them will have been carried under the hook of an upper needle, I'. The needles will have made no movement. During the movement to the next position, Figs. 17 and 22, the feeders will have receded from the position indicated by the dotted circles to the one shown in full circles in Fig. 22, and all of the needles will have commenced to descend. Immediately after the position shown in Figs. 17 and 22 has been passed the feeders will move one-quarter of an inch to the right, and will continue to recede until the bars are back again to their original positions both laterally and longitudinally, Figs. 18 and 25. The needles will have descended; but during their descent the yarn-guide bar L will have made the necessary movement to permit the hook of the upper needle, I', to avoid its (the yarn-guide's) perforations, Fig. 31—viz., one-eighth of an inch toward the left. The upper feeders will continue to move to the right one-quarter of an inch farther until they reach the position indicated in Fig. 24. The yarn-guide bar will continue to move to the left (shown midway in Fig. 32) until it reaches its extreme left-hand position, and the weft-carrier rods will move to their extreme left-hand position, which movement (except in circumstances hereinbefore indicated) will be more than the entire width of fabric. The position indicated in Fig. 23 is now again reached, except that those parts that assume alternately right and left hand positions are now in positions the reverse of those indicated in that figure.

Figs. 33, 34, and 35 describe a modification of a portion of my machine, which modification is used when it is desired to supply to each of the needles K' two or more independently-operated threads. It consists of an additional yarn-guide bar, $L^x$, similar in its manner of operation to the yarn-guide bar L; but the motion of this bar is eccentric in operation with relation to the bar L. It is intended that while one bar may be carrying a particular knitting-thread continuously to one and the same needle the other will carry a particular one alternately to one or the other of two contiguous needles, or may carry it successively to each of three or more needles. Both bars may carry their individual yarns to two or more needles, but remain eccentric in their movements in relation to one another. This modification is equally adapted to a machine employing feeders like the one described in the present application or to one provided with vertical and horizontal needles like the one described in my aforesaid application for Letters Patent filed February 3, 1882, Serial No. 51,815.

By an arrangement of needles and yarn-guides similar to that illustrated in Fig. 33 the feeders may, if desired, be omitted, and the two yarn-guides made to supply both sets of needles with yarns by so operating the yarn-guide bars that one of them will supply one series of yarns exclusively to one series of the needles, while the other yarn-guide bar will supply yarns exclusively to the other series of needles; or the feeders may be still employed and one series of the needles caused to receive yarns from both a yarn-guide bar and from the feeders.

Having described my improvement and the best way at present known to me of carrying the same into effect, what I claim herein as new and of my own invention is as follows:

1. The combination, substantially as hereinbefore set forth, with two sets of needles arranged to form the loops of their stitches upon one and the same face of the fabric, guiding mechanism for a series of longitudinal yarns, and devices for delivering a weft-yarn on each side of the series of longitudinal yarns, of feeding devices for supplying yarn to each set of needles and mechanism for imparting a reciprocating motion to said needles and to the weft-yarn-delivering devices and for operating the needle-yarn-supplying devices.

2. The combination, substantially as hereinbefore set forth, with two independent sets of needles arranged in the same plane and to form the loops of their stitches upon one and the same face of the fabric and devices for supplying yarn to each set of needles, of mechanism for imparting a reciprocating movement simultaneously to all the needles of each set independently of the other.

3. The combination, with a set of needles, devices for supplying and guiding a series of longitudinal yarns, and mechanism for reciprocating said needles, of yarn-feeders arranged on the other side of the said longitudinal yarns from the needles, and mechanism for operating said feeders to carry their yarns between the adjacent yarns of the longitudinal series and around said needles, substantially as and for the purposes hereinbefore set forth.

4. The combination, substantially as hereinbefore set forth, with two sets of needles arranged in the same plane, with the needles of one set between and alternating with the needles of the other set, devices for supplying and guiding a series of longitudinal yarns, and mechanism for reciprocating both sets of said needles, of a yarn-guide bar arranged in front of the needles for delivering yarn to one set thereof, a set of yarn-feeders arranged in rear of said needles for carrying yarns between the adjacent yarns of the longitudinal series and around the needles of the other set, and mechanism for operating said yarn-guide bar and feeders.

5. The combination, substantially as hereinbefore set forth, with two sets of needles arranged in the same plane, with the needles of one set between and alternating with the needles of the other set, devices for supplying and guiding a series of longitudinal yarns, and carriers arranged to lay a weft-yarn on each side of said longitudinal yarns, of a yarn-guide bar arranged in front of the needles for delivering yarn to one set thereof, a set of feeders located in rear of said needles for carrying yarns between the adjacent yarns of the longitudinal series and around the needles of the other set, and mechanism for reciprocating both sets of needles and the weft-carriers and for operating the said guide-bar and feeders.

6. The combination, substantially as hereinbefore set forth, with a set of needles, devices for supplying and guiding longitudinal strands, weft-supplying devices, and a series of devices for supplying yarn to such needles, and mechanism for reciprocating said needles and operating the needle-yarn and weft supplying devices, of a second series of needle-yarn-supplying devices acting in connection with the first-mentioned series, and mechanism for causing them to move to the right or left with relation to said first-mentioned series the distance between any two or more needles at each successive knitting operation of said needles.

7. The combination, substantially as hereinbefore set forth, with a set of needles, devices for supporting and guiding a series of longitudinal yarns, weft-supplying devices, a set of feeders for carrying a series of yarns between the adjacent yarns of the longitudinal series and around the needles, and mechanism for operating said needles and feeders, of a second set of feeders and devices for causing them to move with the first-mentioned feeders as they advance to carry their yarns around the needles, and also to move laterally to the right or left the distance between any two or more feeders at each successive retraction of the same to lay their yarn in zigzag lines upon the back of the fabric.

8. The combination, substantially as hereinbefore set forth, with a row of needles, a series of feeders, O', and mechanism for advancing said feeders toward the needles and carrying their yarn-delivering ends around the upper ends of the same, of a second series of feeders, N', and devices for causing them to travel with the first-mentioned feeders as they advance to carry their yarn-delivering ends around the upper ends of the needles, and also to move laterally to the right or left the distance between any two feeders at each successive retraction of the same.

9. The combination, substantially as hereinbefore set forth, with two sets of needles, guiding mechanism for a series of longitudinal yarns, devices for delivering a weft-yarn on each side of the series of longitudinal yarns, a series of feeders for delivering yarns to one set of needles, and mechanism for operating the needles, the weft-yarn-supplying devices, and the feeders, of a guide-bar for delivering yarns to the other set of needles, a second series of feeders acting in connection with the first-mentioned series, and mechanism for reciprocating both series of feeders and the guide-bar, and for causing the second series of feeders to move to the right or left with relation to the other series the distance between any two or more needles at each successive knitting operation of said needles.

10. The combination, substantially as hereinbefore set forth, with the feeder-bars N O, provided with feeders N' O', respectively, cams $N^3$, and connecting-rods $N^2$, of the cams $N^4 O^4$ and levers $N^6 O^6$.

11. The combination, substantially as hereinbefore set forth, with the weft-carrying rods R S, provided with fingers R' S', respectively, and rack $R^6$, of the cam $R^2$, finger $R^3$, shaft $R^4$, gear-segment $R^5$, and connecting-bar $S^2$.

12. The combination, substantially as hereinbefore set forth, with two sets of needles arranged in the same plane, with the needles of one set between and alternating with the needles of the other set, of mechanism for simultaneously reciprocating all the needles of each set independently of the other and imparting to one set a greater reciprocation than to the other.

13. The combination, substantially as hereinbefore set forth, with the needle-bars I and K and needles I' and K', secured therein, of the cams $I^3 K^3$ and connecting-rods $I^2$ and $K^2$, whereby the needle-bars and their respective sets of needles are reciprocated at different distances.

14. The take-up rolls and the tension devices for the longitudinal strands, in combination with a series of needles, the main needle-bed, and the auxiliary needle-bed arranged and operating to hold the said longitudinal strands close against the needles notwithstanding the stress of tension exerted by said devices and rolls upon the said strands, substantially as hereinbefore set forth.

15. The combination, substantially as hereinbefore set forth, with two sets of needles arranged in the same plane, and mechanism for simultaneously reciprocating all the needles of each set independently of the other, of feeders for delivering yarn to said needles and mechanism for operating said feeders, and for causing each of them to supply yarns to the set of needles pertaining to it to the exclusion of the other set.

In testimony whereof I have hereunto set my hand this 9th day of November, A. D. 1887.

BENJAMIN L. STOWE.

Witnesses:
HELEN J. STOWE,
GEORGE A. WIES.